March 12, 1940. H. R. TONEY 2,192,945
OIL WELL BOTTOM RELEASE VALVE
Filed Aug. 15, 1938

Inventor
HOMER R. TONEY
By Francis B. Leech
Attorney

Patented Mar. 12, 1940

2,192,945

UNITED STATES PATENT OFFICE 2,192,945

OIL WELL BOTTOM RELEASE VALVE

Homer R. Toney, Vivian, La., assignor of one-half to John R. Beddingfield, Shreveport, La.

Application August 15, 1938, Serial No. 225,017

3 Claims. (Cl. 166—2)

This invention relates to an apparatus for controlling the flow of oil wells and more particularly to a novel well bottom release valve for accomplishing this purpose.

One of the principal objects of the present invention is to provide an apparatus to be placed in the bottom of an oil well for completely sealing off the oil flow into the casing with means to control this flow when it is desired to pump or flow the well.

Another object in the invention is to place such a bottom release valve in the lower end of the casing which is readily operated from the surface to positively shut off the flow of oil from the well into the casing and to incorporate therewith a combined valve actuator and flow tube for moving the fluid to the surface.

A still further object is to provide such a combination together with a gas lift for expediting the flow of oil from the well.

Figure 1:
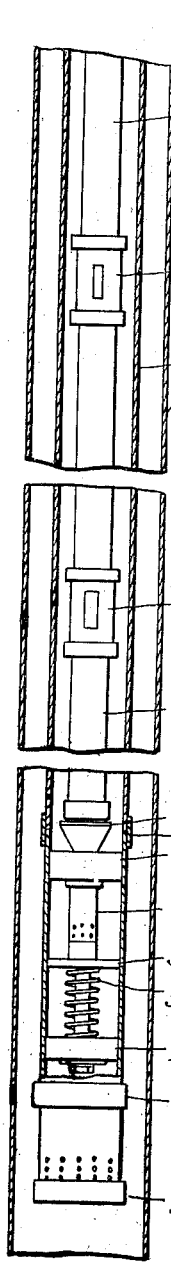
Fig. 1 is a fragmentary view partly in cross-section of the lower portion of the well illustrating the well casing, gas tubing, bottom valve, and flow pipe.

Essentially the invention comprises a central gas pipe 1 placed within a conventional large diameter well casing 2 which extends to the bottom of the well. At the lower end of the gas pipe 1, and ordinarily spaced slightly above the bottom of the well is a perforated pipe or strainer section 3 joined by screw collar 4 to the gas pipe and with a perforated cap 5 screwed to the end of the strainer section. Also attached to gas pipe 1 by screw collar 7, and lying between the end of the pipe and strainer 3 is a cylindrical valve chamber 10 within which is mounted the bottom release valve mechanism per se.

Figure 2:
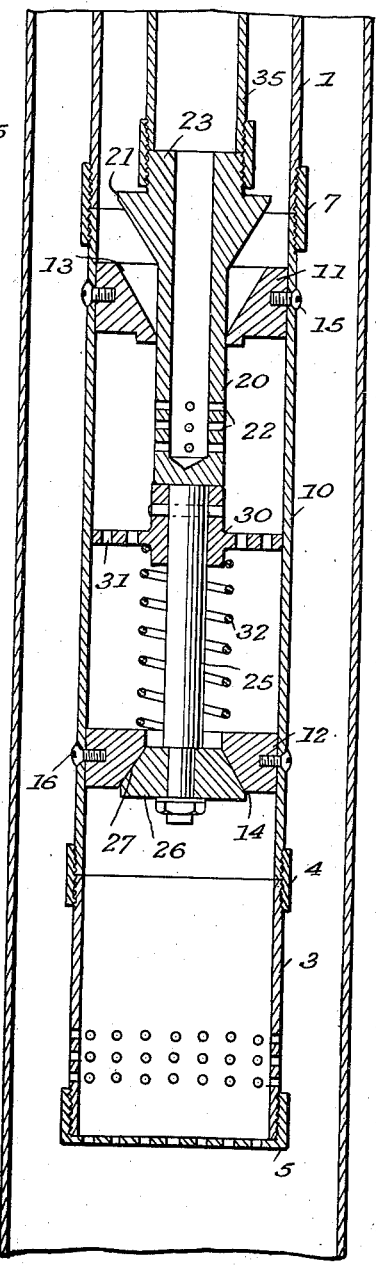
Fig. 2 is a vertical cross-section of the bottom release valve and associated casing with the release valve in closed position.
Figure 3:
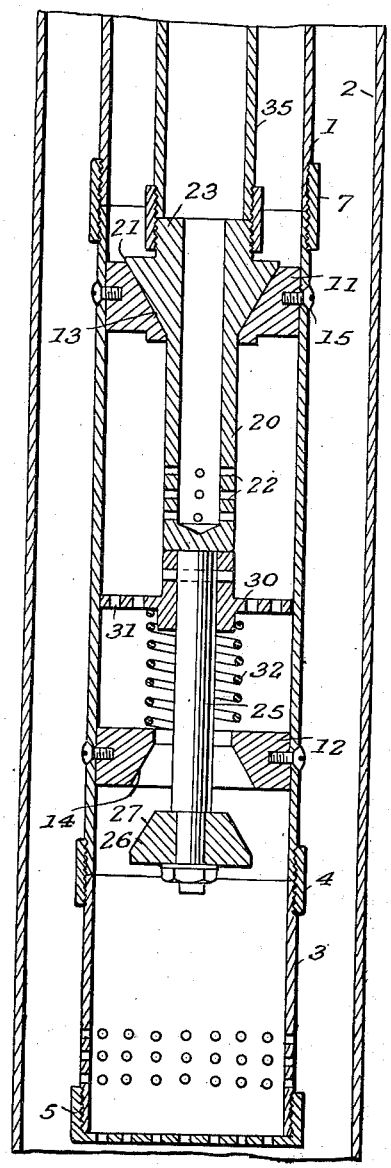
Fig. 3 is a similar view to Fig. 2 with the release valve in open position.

As shown in Figs. 2 and 3 the valve consists of spaced rings 11 and 12 provided with outwardly flared tapered openings 13 and 14, respectively. These rings may be affixed within the cylinder 10 in any desired manner, although for purposes of illustration they are shown held therein by screws 15 and 16. The valve proper comprises a stem 20 having an outwardly tapered upper portion 21 which forms a fluid tight seal with the tapered seat 13 machined in upper ring 11. The lower portion of the hollow stem 20 is provided with a plurality of transverse fluid ports 22 for the ingress of oil into the central bore 23.

A lower valve stem 25 is also mounted within the cylinder 10 and has a tapered valve disc 26 bolted or integrally formed thereon. The tapered face 27 of the lower valve cooperates with tapered face 14 formed in the lower ring 12 and forms a fluid-tight seal between the strainer 3 and the interior of the cylinder 10 when the valve 26 is in contact with the seat 14.

Mounted in a suitable manner on the upper end of lower valve stem 25 is a perforated plate 30 having a plurality of vertical openings 31 therein for passage of fluid. A coil spring 32 is placed around the valve stem 25 with its ends abutting the under portion of the plate 30 and the upper surface of the ring 12 to normally urge the valve 26 into closed position as shown in Fig. 2.

A central oil flow pipe 35 of comparatively small diameter as compared to gas pipe 1 and outer casing 2 is coupled to the upper end of valve 21 and receives fluid passing upwardly from bore 23, the fluid flow pipe 35 extending upwardly through the casing 2 to a point beyond the surface and is lead to a suitable tank or collection vessel. Flow pipe 35 may also be provided with a plurality of spaced gas lift valves 36 coupled between the sections of the string to assist in flowing oil from the bottom of the well to the surface, as shown in detail and claimed in my copending application, Ser. No. 209,617, filed May 23, 1938. While these gas lift valves may be used in conjunction with the present invention, it is to be distinctly understood that they are not essential to its successful operation.

In use, the oil well operator couples the bottom release valve 10 and strainer 3 on the end of the gas line 1 and also affixes the fluid pipe 35 to the upper end of the valve mechanism, after which both strings are placed within the well. The vertical position fluid pipe 35 is slightly restrained with relation to the gas pipe 1 so that the valve 14 is normally closed, and this action is assisted by the spring 32 in addition to the slight elevation of the line. Thus, oil which seeps in through the end and side opening of strainer 3 cannot pass upwardly through the valve until the fluid pipe 35 is released and permitted to drop a short distance to open the lower valve 27 and also seat the upper valve 21 against tapered face 13, as shown in Fig. 3. This action opens lower valve 27 and permits the oil to pass upwardly through perforated plate 30 and into the cylinder bore 23 through openings 22.

In many wells there is insufficient internal oil and/or gas pressure to force the oil to the surface through fluid pipe 35 in which event external gas pressure or compressed air is introduced into the space between the gas line 1 and fluid pipe 35 and thereafter successively admitted into fluid pipe 35 through the lift valves 36 as fully described in my copending application, Serial No. 209,617, filed May 23, 1938.

It will be understood by those skilled in the art that the present invention permits a well to be completely sealed off at its bottom when not in use and thus prevent escape of oil until the operator desires to flow or pump the same, and such a device is particularly valuable in flowing oil wells which have ceased to flow of their own accord and which must be permitted to stand idle over determined periods to build up a satisfactory supply of oil.

Having thus described my invention, what I claim as new and desire to secure by Letters Patent of the United States is:

1. An oil well bottom release valve comprising a cylindrical casing secured to a pipe line extending into the bottom of a well, a spring pressed normally closed valve mounted in the lower end of said casing, a valve stem for said valve terminating within said casing, a perforated centering disc secured to said valve stem, and a vertically movable discharge pipe for said casing extending to the surface of the well, said discharge pipe terminating in a perforated end and adapted to be dropped against the end of said valve stem for opening said valve.

2. An oil well bottom release valve comprising a casing secured to a pipe line extending into the bottom of a well, a normally closed valve mounted in the lower portion of said casing, a valve seat therefor, a stem for said valve terminating within said casing, a perforated centering disc secured to the end of said stem, a coil spring surrounding said stem and having its ends abutting said valve seat and said centering disc, a vertically movable discharge pipe for said casing extending to the surface of the well, the lower end of said discharge pipe terminating in a perforated end portion adapted to be pressed against the upper end of the said valve stem for opening the same.

3. An oil well bottom release valve comprising a casing secured to a pipe line extending into the bottom of a well, a normally closed valve mounted in the lower portion of said casing, a tapered valve seat therefor, secured in the lower end of said casing, a stem for said valve terminating within said casing, a perforated centering disc secured to the end of said stem and movable therewith, a coil spring surrounding said stem and having its ends abutting said valve seat and said centering disc, a vertically movable discharge pipe for said casing extending to the surface of the well, the lower end of said discharge pipe terminating in a nozzle having radial openings in the end portion thereof, the unperforated solid end of said nozzle being adapted to be pressed against the end of said valve stem to overcome the tension of said spring and unseat the said valve.

HOMER R. TONEY.